(12) United States Patent
Matsubara et al.

(10) Patent No.: US 10,934,369 B2
(45) Date of Patent: Mar. 2, 2021

(54) HYPROMELLOSE PHTHALATE AND METHOD FOR PRODUCING THE SAME

(71) Applicant: SHIN-ETSU CHEMICAL CO., LTD., Tokyo (JP)

(72) Inventors: Junichi Matsubara, Niigata (JP); Mitsuhiro Yoshida, Niigata (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/407,871

(22) Filed: May 9, 2019

(65) Prior Publication Data

US 2019/0345263 A1    Nov. 14, 2019

(30) Foreign Application Priority Data

May 11, 2018   (JP) .............................. JP2018-092116

(51) Int. Cl.
*C08B 13/00*    (2006.01)
(52) U.S. Cl.
CPC ..................................... *C08B 13/00* (2013.01)
(58) Field of Classification Search
None
See application file for complete search history.

(56) References Cited

FOREIGN PATENT DOCUMENTS

| CN | 101225115 | 7/2008 | |
|---|---|---|---|
| EP | 0648487 | 4/1995 | |
| JP | S49-034582 | 9/1974 | |
| JP | H07-109219 | 4/1995 | |
| WO | WO-2017223017 A2 * | 12/2017 | ............. C08B 13/00 |

OTHER PUBLICATIONS

European Search Report corresponding to European Application No. 19172187.7 dated Oct. 16, 2019.

* cited by examiner

*Primary Examiner* — Layla D Berry
(74) *Attorney, Agent, or Firm* — Myers Bigel, P.A.

(57) ABSTRACT

There is provided a method for producing hypromellose phthalate (HPMCP) which exhibits an excellent solubility when dissolved in a solvent, while suppressing formation of undissolved matter. More specifically, there is provided a method for producing HPMCP, including an esterification step of esterifying hypromellose dissolved in glacial acetic acid with phthalic anhydride in the presence of sodium acetate at a temperature of from 75 to 100° C. to obtain a reaction product solution; a cooling step of cooling the reaction product solution to 70° C. or lower; and a precipitation step of mixing the cooled reaction product solution with water of from 0 to 40° C. to obtain a suspension of precipitated HPMCP.

4 Claims, No Drawings

HYPROMELLOSE PHTHALATE AND METHOD FOR PRODUCING THE SAME

RELATED APPLICATION

This application claims priority from Japanese Patent Application No. 2018-092116, filed May 11, 2018, the disclosures of which is incorporated by reference herein in its entirety.

BACKGROUND OF THE INVENTION

The invention relates to hypromellose phthalate and a method for producing the hypromellose phthalate.

Hypromellose phthalate, which is widely known as one of enteric polymers, is a polymer having a cellulose skeleton into which three substituent groups are introduced. The three substituent groups are a methyl group (—$CH_3$) and a hydroxypropyl group (—$C_3H_6OH$), each forming a part of an ether structure; and a carboxybenzoyl group (—$COC_6H_4COOH$), forming a part of an ester structure. This enteric polymer hypromellose phthalate, which is also called hydroxypropyl methyl cellulose phthalate and hereinafter may be abbreviated as "HPMCP", is widely used as an enteric coating agent.

An enteric coating preparation is one of important preparations widely used, e.g., for administration of an acid-labile drug, or for the purpose of protecting gastric mucosa. Conventionally, an enteric coating preparation is generally produced by dissolving an enteric polymer in an organic solvent, and spraying the resulting solution to form an enteric film over the surface of the drug. In consideration of the issues associated with the use of the organic solvent, such as environmental conservation and safety, a so-called aqueous enteric coating method has been developed in which an enteric polymer is finely pulverized and is used as an aqueous dispersion thereof (JP H07-109219A).

In addition to the coating applications and the controlled drug release applications, HPMCP is also used in a wide variety of applications, such as an application of producing a solid dispersion containing a water-insoluble drug through a hot melt extrusion or a spray dry. Among them, the hot melt extrusion has been attracting attention. It is because the hot melt extrusion can avoid the use of a solvent, so that it is applicable to water-unstable drugs, and does not require the recovery of the solvent, thereby reducing the safety and environmental concerns, saving energy required for the solvent recovery steps, and improving the safely for operators.

HPMCP has an advantageous property of excellent solubility in an alkaline aqueous solution and in an organic solvent. However, HPMCP has a disadvantageous property of poor stability to moisture, causing hydrolysis during the use or storage thereof to generate phthalic acid. JP S49-034582A describes that HPMCP having improved stability to moisture can be obtained by subjecting synthesized HPMCP to partial hydrolysis.

SUMMARY OF THE INVENTION

However, it is undesirable from the standpoint of the productivity and economy to use phthalic anhydride in a larger amount than the amount required to achieve the degree of substitution of the final product in consideration of the amount lost for the hydrolysis so as to obtain HPMCP having improved stability.

In addition, when the hydrolysis occurs, the carboxybenzoyl group is eliminated from HPMCP, resulting in decreased solubility in a solvent due to reduced degree of substitution. Typically, filtration is carried out prior to coating in order to remove undissolved matter from HPMCP alone or a composition in which both of a drug substance and HPMCP are dissolved. However, a large amount of undissolved matter may cause clogging of the filter, thereby impairing the operability. Even in a case where no filter is used, there is a risk that clogging may occur in a nozzle used in the coating. Further, the decreased degree of substitution of the carboxybenzoyloxy group may decrease the amount of coated film, so that the desirable acid resistance may not be obtained. Therefore, there is a demand to further improve the solubility of conventional HPMCP.

The invention has been made in these circumstances, and objects of the invention are to provide HPMCP which exhibits an excellent solubility in a solvent, while suppressing generation of undissolved matter, and to provide a method for producing the HPMCP.

As a result of intensive studies to attain the objects, the inventors have found that the hydrolysis rate can be suppressed by cooling a reaction product solution obtained in the reaction to produce HPMCP, and have completed the invention.

In an aspect of the invention, there is provided a method for producing hypromellose phthalate, comprising an esterification step of esterifying hypromellose dissolved in glacial acetic acid with phthalic anhydride in the presence of sodium acetate at a temperature of from 75 to 100° C. to obtain a reaction product solution; a cooling step of cooling the reaction product solution to 70° C. or lower; and a precipitation step of mixing the cooled reaction product solution with water of from 0 to 40° C. to obtain a suspension of precipitated hypromellose phthalate.

According to the invention, elimination of the carboxybenzoyl group through the hydrolysis of HPMCP can be suppressed, so that the solubility of HPMCP in a solvent is improved and generation of undissolved matter can be suppressed. On this account, clogging of a filter can be decreased for removal of the undissolved matter from HPMCP.

DETAILED DESCRIPTION OF THE PREFERRED EMBODIMENTS

The method for producing HPMCP will be described below.

Starting material hypromellose, which is also called hydroxypropyl methyl cellulose and hereinafter may be abbreviated as "HPMC", may be produced by a method known in the an, for example, by bringing pulp in the form of sheet, chip or powder into contact with an alkali, such as sodium hydroxide or potassium hydroxide, to form alkali cellulose, and then reacting the alkali cellulose with etherifying agents such as methyl chloride and propylene oxide.

An alkali metal hydroxide solution to be used as the alkali is not particularly limited as long as the alkali cellulose is obtained. An aqueous solution of sodium hydroxide or potassium hydroxide is preferred from the standpoint of economy. The concentration of the alkali metal hydroxide solution is preferably from 23 to 60% by mass, more preferably from 35 to 55% by mass, from the standpoint of the stable composition of alkali cellulose and securing of optical transparency of the cellulose ether.

The produced alkali cellulose is subjected to etherification reaction with etherifying agents such as methyl chloride and propylene oxide in a conventional manner to obtain HPMC.

HPMC thus obtained has a degree of substitution (DS) of the methoxy group of preferably 0.73 to 2.83, more preferably 1.25 to 2.37. The HPMC has a molar substitution (MS) of the hydroxypropoxy group of preferably 0.10 to 1.90, more preferably 0.12 to 0.95. A degree of substitution (DS) of the methoxy and a molar substitution (MS) of hydroxypropoxy groups may be calculated from the values determined in accordance with "Assay" for hypromellose described in the Japanese Pharmacopoeia 17th Edition.

An aqueous 2 mass % HPMC solution has a viscosity at 20° C. of preferably 2.2 to 18.0 mPa·s, more preferably 5.0 to 16.5 mPa·s, as determined in accordance with "Method I Viscosity measurement by capillary tube viscometer" described in the Japanese Pharmacopoeia 17th Edition.

Hypromellose (HPMC) thus produced or commercially available HPMC may be used for producing HPMCP through the esterification step, the cooling step, the precipitation step, an optional washing step, an optional draining step and an optional drying step.

In the esterification step, HPMC is reacted with phthalic anhydride, which is an esterifying agent, in the presence of a catalyst to obtain a reaction product solution.

A solvent to be used in the esterification step is preferably one capable of dissolving all of HPMC, the esterifying agent and the catalyst. Examples of the solvent include glacial acetic acid rather than water. The amount of the solvent may be preferably 1.0 to 3.0 times, more preferably 1.2 to 2.0 times, and still more preferably 1.5 to 1.8 times the amount of HPMC on the basis of mass ratio, from the standpoint of the reaction rate.

The catalyst to be used in the esterification step is preferably an alkali metal chlorate such as sodium chlorate, or an alkali metal carboxylate such as sodium acetate, from the standpoint of the stability and economy. The amount of sodium chlorate may be preferably 0.004 to 0.060 times, more preferably 0.01 to 0.03 times the amount of the starting HPMC on the basis of mass ratio, from the standpoint of bleaching and degree of depolymerization. The amount of sodium acetate may be preferably 0.1 to 1.6 times, more preferably 0.6 to 1.1 times the amount of the starling HPMC on the basis of molar ratio, from the standpoint of the composition and yield.

The amount of phthalic anhydride, which is an esterifying agent, may be preferably 0.4 to 1.8 times, more preferably 0.6 to 1.2 times the amount of the starting HPMC on the basis of molar ratio from the standpoint of the composition and yield.

In the esterification step, a twin-shaft mixer suitable for kneading a high viscosity fluid to form a uniform mixture may be used. Examples of the mixer include the mixers commercially available under the name of kneader or internal mixer.

The reaction temperature in the esterification step is preferably from 75 to 100° C. more preferably from 80 to 95° C., from the standpoint of the reaction rate or viscosity. The reaction time in the esterification step is preferably from 2 to 8 hours, more preferably from 3 to 6 hours.

After the esterification, the resulting reaction product solution is cooled for the purpose of lowering the hydrolysis rate of HPMCP. The cooling is preferably effected within the twin-shaft mixer used for the esterification, by cooling the jacket of the mixer. In the cooling step, the temperature of the reaction product solution is decreased to 70° C. or lower, more preferably 65° C. or lower, and still more preferably 60° C. or lower, from the standpoint of the hydrolysis rate of HPMCP. The lower limit of the temperature of the reaction product solution is, but not particularly limited to, preferably 40° C. or more from the standpoint of the viscosity during transferring the reaction product solution.

After the cooling of the reaction product solution, water of preferably from 0 to 40° C., more preferably from 0 to 30° C. may be optionally added to the reaction product solution from the standpoint of the treatment of unreacted phthalic anhydride and the adjustment of the viscosity. The amount of water to be added is within such a range as not to cause precipitation of HPMCP, and is preferably 0.7 to 2.3 times (mass ratio), more preferably 1.3 to 2.3 times (mass ratio), still more preferably 1.5 to 2.0 times (mass ratio) the amount of the starling HPMC. The temperature of the resulting pre-precipitation reaction product solution obtained by mixing the cooled reaction product solution with the water is preferably 55° C. or lower, more preferably 50° C. or lower, from the standpoint of hydrolysis of HPMCP. The temperature of the resulting pre-precipitation reaction product solution means the temperature of the reaction product solution after mixed with the optional water without precipitation. Control of the temperature of the reaction product solution after mixed with the optional water without precipitation can suppress the generation of phthalic acid through hydrolysis of the obtained HPMCP even when the temperature of the optional water increases owing to increase of atmospheric temperature.

In the precipitation step, the obtained reaction product solution is mixed with water to obtain a suspension of HPMCP through precipitation of HPMCP. The amount of water is preferably 2.2 to 6.0 times, more preferably 3.0 to 5.0 times the amount of the reaction product solution on the basis of mass ratio, from the standpoint of the treatment of unreacted phthalic anhydride and the adjustment of the viscosity. When optional water is added to the cooled reaction product solution, the amount of water to be added in the precipitation step is preferably 0.7 to 5.7 times, more preferably 1.5 to 4.0 times the mass of the reaction product solution on the basis of mass ratio.

The temperature of water to be contacted (i.e. mixed) in the precipitation step is preferably from 0 to 40° C., more preferably from 0 to 30° C. The temperature of the reaction product solution after mixed with the water is preferably 55° C. or lower, more preferably 50° C. or lower, from the standpoint of hydrolysis of HPMCP. Herein, the temperature of the reaction product solution after mixed with the water means the temperature of the reaction product solution at which the HPMCP starts to precipitate through the addition of water, and is preferably maintained until the end of the precipitation.

The precipitated HPMCP may be subjected to an optional washing step and an optional drying step.

In the washing step, the precipitated HPMCP may be washed thoroughly with water to remove residual acetic acid and free phthalic acid. The temperature of water to be used for the washing is preferably from 0 to 50° C., more preferably from 5 to 40° C., and Still more preferably from 10 to 30° C., from the standpoint of suppression of the hydrolysis of HPMCP.

The optional dehydration step may be carried out between the optional washing step and the optional drying step.

In the drying step, HPMCP may be dried by using a tray dryer or a fluidized bed dryer. HPMCP with a high purity may be obtained by drying preferably at 60 to 100° C., more preferably at 70 to 80° C., and preferably for 1 to 5 hours, more preferably for 2 to 3 hours.

The HPMCP thus obtained has a degree of substitution (DS) of the methoxy group of preferably from 0.73 to 2.83, more preferably from 1.25 to 2.37; a molar substitution (MS) of the hydoxypropoxy group of preferably from 0.10 to 1.90, more preferably from 0.12 to 0.95; and a degree of substitution (DS) of the carboxybenzoyloxy group of preferably from 0.370 to 0.740, more preferably from 0.620 to 0.710, and still more preferably from 0.654 to 0.684, the degrees of substitution (DS) of the carboxybenzoyloxy group may be determined by calculation from values measured in accordance with the method described under the heading of "Hypromellose Phthalate" in Official Monographs of the Japanese Pharmacopoeia 17th Edition. The degree of substitution (DS) of the methoxy group and the molar substitution (MS) of the hydoxypropoxy group may be determined in the same manner as those of HPMC.

The HPMCP thus obtained has a transmittance at 20° C. of 85% or more, preferably 88% or more, more preferably 91% or more, as determined in the solution of 10 parts by mass of the HPMCP in 90 parts by mass of acetone. When the transmittance is less than 85%, clogging of a filter or a spray nozzle may occur in a coating step, resulting in deteriorated operability.

The term transmittance refers to transmittance of the solution of HPMCP in acetone as determined with a photoelectric colorimeter PC-50, with the proviso that the transmittance of acetone is 100% as determined under the same conditions. This is an indication of how much HPMCP is dissolved in acetone. For example, a higher transmittance value indicates that a larger part of HPMCP is dissolved in acetone. The transmittance of acetone can be determined in accordance with the method for measuring the transmittance described in "Ultraviolet-visible Spectrophotometry" of "General Tests" in the Japanese Pharmacopoeia 17th Edition.

The solubility of HPMCP in acetone has correlation with the solubility of HPMCP in an organic solvent such as methanol and ethanol, which is used as a solvent in a coating composition or a solid dispersion composition. The solubility of HPMCP in acetone also has correlation with the solubility of HPMCP in an aqueous ammonia solution. Hence, the solubility of HPMCP in acetone can be used as an index of solubility in solvents.

EXAMPLES

The invention will be further described with reference to the following Examples. It should not be construed that the invention is limited to or by Examples.

Example 1

In a 50-L kneader reactor equipped with a twin-shaft mixer, 700 g of hydroxypropyl methyl cellulose having DS of 1.89 and MS of 0.25 and having a viscosity at 20° C. of 5.87 mPa·s, as determined in an aqueous 2% by mass solution thereof, was dissolved in 1120 g of glacial acetic acid. Then, 579.7 g of phthalic anhydride and 10.9 g of sodium chlorate were dissolved therein, followed by dissolution of 295.3 g of sodium acetate therein. The resulting mixture was allowed to react at 85° C. for 4.5 hours.

Subsequently, the resulting reaction product solution was cooled to 50.8° C. Then, 1,287.3 g of pure water of 14.8° C. was added thereto and stirred. The temperature of the reaction product solution at the time when the reaction product solution and the pure water were uniformly mixed was 39.2° C. It was confirmed that the reaction product solution and the pure water were uniformly mixed without causing any precipitation of HPMCP Thereafter, the reaction product solution was subjected to gradual addition of water of 25.0° C. in an amount of four times the mass of the reaction product solution to obtain an HPMCP suspension in which the reaction product (HPMCP) precipitated. The temperature of the obtained HPMCP suspension was 27.9° C.

The HPMCP contained in the HPMCP suspension was thoroughly washed with water of 23.7° C., and then dried in a fluidized bed dryer at 80° C. for 2 hours. The dried product was allowed to pass through a sieve (#7.5) having an opening of 2860 μm to obtain HPMCP powder having a degree of substitution of carboxybenzoyloxy of 0.675.

The solubility of the HPMCP powder in acetone was evaluated by the method described below.

In an eight-ounce bottle, 198.0 g of acetone was weighed and stirred by using a stirring impeller at 200 rpm for 5 minutes. Then, 22 g of the obtained HPMCP was added thereto and stirred by using a stirring impeller at 200 rpm for 60 minutes. Then, the rotation of the stirring impeller was stopped, and the resulting solution was used as a measurement solution. This measurement solution showed a transmittance at 20° C. of 91.0% when measured with a photoelectric colorimeter PC-50.

The results of the temperature of the reaction product solution after the cooling step, the temperature of the reaction product solution after mixed with the water, and the transmittance are shown in Table 1.

Example 2

In a 50-L kneader reactor equipped with a twin-shaft mixer, 700 g of hydroxypropyl methyl cellulose having DS of 1.89 and MS of 0.25 and having a viscosity at 20° C. of 5.87 mPa·s, as determined in an aqueous 2% by mass solution thereof, was dissolved in 1120 g of glacial acetic acid. Then, 579.7 g of phthalic anhydride and 10.9 g of sodium chlorate were dissolved therein, followed by dissolution of 295.3 g of sodium acetate therein. The resulting mixture was allowed to react at 85° C. for 4.5 hours.

Subsequently, the resulting reaction product solution was cooled to 61.1° C. Then, 1287.3 g of pure water of 14.8° C. was added thereto and stirred. The temperature of the reaction product solution at the time when the reaction product solution and the pure water were uniformly mixed was 46.2° C. It was confirmed that the reaction product solution and the pure water were uniformly mixed without causing any precipitation of HPMCP. Thereafter, the reaction product solution was subjected to gradual addition of water of 25.0° C. in an amount of four times the mass of the reaction product solution to obtain an HPMCP suspension in which the reaction product (HPMCP) precipitated. The temperature of the obtained HPMCP suspension was 29.2° C.

Then, the precipitates were thoroughly washed with water of 22.4° C., and then dried in a fluidized bed dryer at 80° C. for 2 hours. The dried product was allowed to pass through a sieve (#1.5) having an opening of 2860 μm to obtain HPMCP powder having a degree of substitution of carboxybenzoyloxy of 0.660.

The transmittance was measured in the same manner as in Example 1. The results of the temperature of the reaction product solution after the cooling step, the temperature of the reaction product solution after mixed with the water, and the transmittance are shown in Table 1.

Comparative Example 1

In a 50-L kneader reactor equipped with a twin-shaft mixer, 700 g of hydroxypropyl methyl cellulose having DS of 1.89 and MS of 0.25 and having a viscosity at 20° C. of 5.87 mPa·s, as determined in an aqueous 2% by mass solution thereof, was dissolved in 1120 g of glacial acetic acid. Then, 579.7 g of phthalic anhydride and 10.9 g of sodium chlorate were dissolved therein, followed by dissolution of 295.3 g of sodium acetate therein. The resulting mixture was allowed to react at 85° C. for 4.5 hours.

Subsequently, the resulting reaction product solution having a temperature of 84.8° C. was, without being cooled, subjected to addition of 1287.3 g of pure water of 16.8° C. and stirred. The temperature of the reaction product solution at the time when the reaction product solution and pure water were uniformly mixed was 62.9° C. It was confirmed that the reaction product solution and pure water were uniformly mixed without causing any precipitation of HPMCP. Thereafter, the reaction product solution was subjected to gradual addition of water of 25.0° C. in an amount of four times the mass of the reaction product solution to obtain an HPMCP suspension in which the reaction product (HPMCP) precipitated. The temperature of the obtained HPMCP suspension was 32.6° C.

Then, the precipitates were thoroughly washed with water of 23.7° C. and then dried in a fluidized bed dryer at 80° C. for 2 hours. The dried product was allowed to pass through a sieve (#7.5) having an opening of 2860 μm to obtain HPMCP powder having a degree of substitution of carboxybenzoyloxy of 0.619.

The transmittance was measured in the same manner as in Example 1. The results of the temperature of the reaction product solution after the cooling step, the temperature of the reaction product solution after mixed with the water, and the transmittance are shown in Table 1.

TABLE 1

| | temperature of reaction product solution after being cooled (° C.) | temperature of the obtained HPMCP suspension (° C.) | transmittance (%) |
|---|---|---|---|
| Example 1 | 50.8 | 27.9 | 91.0 |
| Example 2 | 61.1 | 29.2 | 89.5 |
| Comp. Ex. 1 | 84.8 (not cooled) | 32.6 | 80.5 |

The invention claimed is:

1. A method for producing hypromellose phthalate, comprising:
   an esterification step of esterifying hypromellose dissolved in glacial acetic acid with phthalic anhydride in the presence of sodium acetate at a temperature of from 75 to 100° C. to obtain a reaction product solution;
   a cooling step of cooling the reaction product solution to a temperature of 70° C. or lower; and
   a precipitation step of mixing the cooled reaction product solution with water of from 0 to 40° C. to obtain a suspension of precipitated hypromellose phthalate; and further comprising,
   between the cooling step and the precipitation step, a step of mixing the cooled reaction product solution with such an amount of water of from 0 to 40° C. as not to cause precipitation of hypromellose phthalate;
   wherein no water is added to the reaction product solution until the reaction product solution is cooled to said temperature of 70° C. or lower.

2. The method for producing hypromellose phthalate according to claim 1, wherein said cooling step comprises cooling the reaction product solution to a temperature of from 40 to 70° C.

3. The method for producing hypromellose phthalate according to claim 1, wherein, in the precipitation step, a temperature of the reaction product solution after mixed with the water is 55° C. or lower.

4. The method for producing hypromellose phthalate according to claim 2, wherein, in the precipitation step, a temperature of the reaction product solution after mixed with the water is 55° C. or lower.

* * * * *

UNITED STATES PATENT AND TRADEMARK OFFICE
CERTIFICATE OF CORRECTION

PATENT NO. : 10,934,369 B2
APPLICATION NO. : 16/407871
DATED : March 2, 2021
INVENTOR(S) : Matsubara et al.

Page 1 of 1

It is certified that error appears in the above-identified patent and that said Letters Patent is hereby corrected as shown below:

In the Specification

Column 6, Line 62: Please correct "(#1.5)" to read -- (#7.5) --

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*